Figure 1:
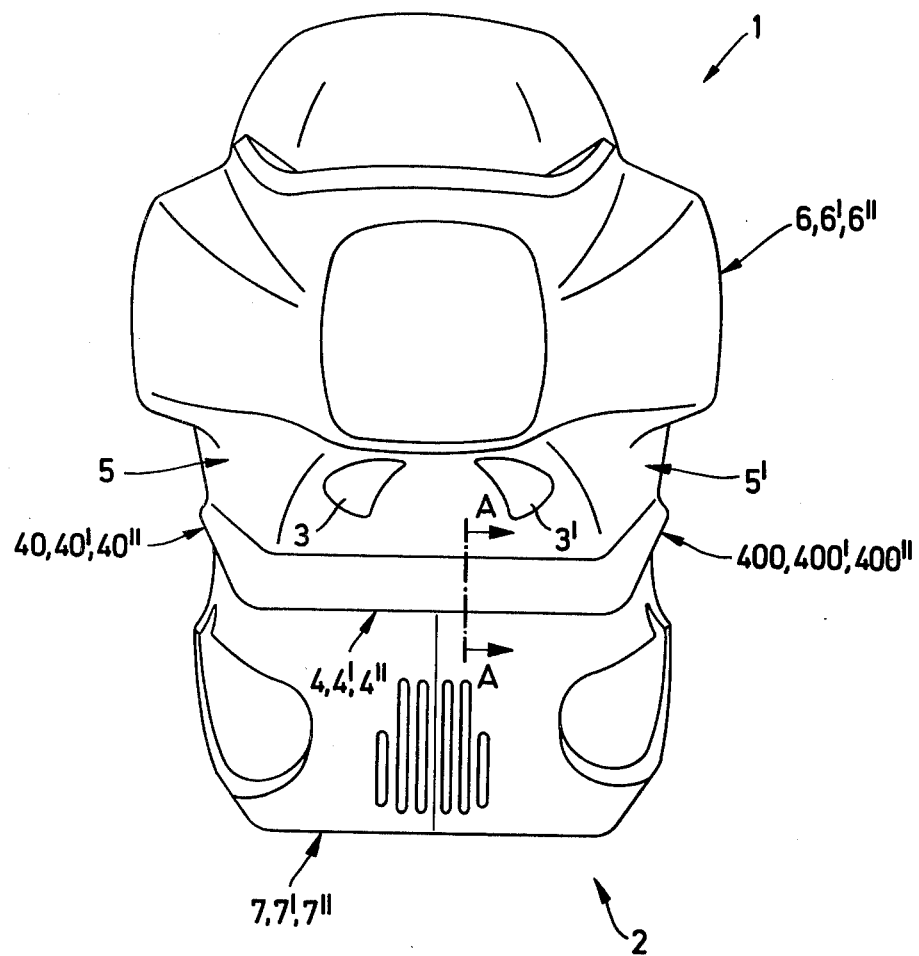

United States Patent [19]

Muth et al.

[11] 4,178,033

[45] Dec. 11, 1979

[54] MOTORCYCLE COVERING

[75] Inventors: Hans-Albrecht Muth, Hechendorf; Hans-Günther v. d. Marwitz, München, both of Fed. Rep. of Germany

[73] Assignee: Bayerische Motoren Werke Aktiengesellschaft, Fed. Rep. of Germany

[21] Appl. No.: 799,951

[22] Filed: May 24, 1977

[30] Foreign Application Priority Data

Jun. 3, 1976 [DE] Fed. Rep. of Germany ....... 2624850

[51] Int. Cl.$^2$ ............................................. B62J 17/04
[52] U.S. Cl. ................................ 296/78.1; 280/289 S; D12/182
[58] Field of Search ............................. 296/78.1, 84 R; 280/289 G, 289 H, 289 S; D12/182

[56] References Cited

U.S. PATENT DOCUMENTS

| 4,023,853 | 5/1977 | Oguma et al. ................ 296/78.1 |
| 4,087,110 | 5/1978 | Vetter ............................ 280/289 S |

*Primary Examiner*—Joseph F. Peters, Jr.
*Assistant Examiner*—Donn M. McGiehan
*Attorney, Agent, or Firm*—Craig and Antonelli

[57] ABSTRACT

A fairing-like covering for a motorcycle which covers essentially the area of the handlebar as well as lateral areas of the motorcycle, and which essentially consists of an upper and of a lower part; a spoiler is thereby arranged at the covering which covers off the connecting place of the upper and lower part.

4 Claims, 3 Drawing Figures

MOTORCYCLE COVERING

The present invention relates to a covering for a motorcycle which essentially covers the area of the handlebar as well as lateral areas of the motorcycle, whereby the fairing-like covering is constructed essentially of an upper part and of a lower part.

As known, the upper and lower part of the covering are arranged overlapping at the connecting place and are connected with each other with threaded fasteners. A step results at the covering by means of this overlapped arrangement, which is detrimental to the styling of the covering. The upper and lower part must be accurately bored with respect to one another in order to avoid that one of the covering parts bulges between two screws in the screwed-together condition. On the one hand, this looks unappealing and, on the other, this reduces the protection for the motorcyclist from wind and moisture. For styling reasons screws or bolts with appealingly shaped heads are used for the threaded connection which are expensive disadvantageously. Finally, the bolts or screws project from the covering at the inner side thereof. This entails the danger that the driver may get stuck with his clothes at these projections. While this danger can be reduced by protective caps, the protective caps represent an additional structural element, again increasing the cost of the threaded connection.

The present invention is therefore concerned with the task to so construct a fairing-like covering of the aforementioned type that the described disadvantages at the connecting place of the upper and lower part of the covering are avoided.

The underlying problems are solved according to the present invention in that a spoiler is arranged at the fairing which covers the connecting place of the upper and lower part.

It is achieved in an advantageous manner by means of the construction of the covering according to the present invention that the connecting place of the upper and lower part is no longer visible. This entails the further advantage of a simple and inexpensive construction of the connecting place between the covering parts.

In realization of the present invention, it is proposed with a spoiler formed at the upper part of the covering that the upper part be constructed projecting from the motorcycle obliquely outwardly downwardly for the formation of a spoiler in its lower edge area and that a connecting flange for the lower part be arranged at the spoiler along the inner side thereof.

A spoiler which is "opened in the downward direction" is provided by the proposal described hereinabove, which in conjunction with an essentially vertically directed connecting flange at the inside of the spoiler produces the advantages of a readily accessible connecting place of the upper and lower part. This is of significance especially for a fairing-like covering with a lower part that is adapted to be rapidly installed and removed.

Accordingly, it is an object of the present invention to provide a motorcycle covering which avoids by simple means the aforementioned shortcomings and drawbacks encountered in the prior art.

Another object of the present invention resides in a motorcycle fairing which permits a simple connection with threaded fasteners, for example, yet does not disturb the pleasing appearance to the observer.

A further object of the present invention resides in a motorcycle covering of the fairing-type described above which assures improved protection to the driver against wind and moisture.

Still a further object of the present invention resides in a motorcycle covering which is relatively simple, involves relatively inexpensive parts and can be readily assembled and disassembled.

Another object of the present invention resides in a covering for motorcycles which minimizes the danger of tearing the driver's clothes at projecting parts of the covering, yet ensures good accessibility of the threaded connections between the various parts of the covering.

Figure 2:
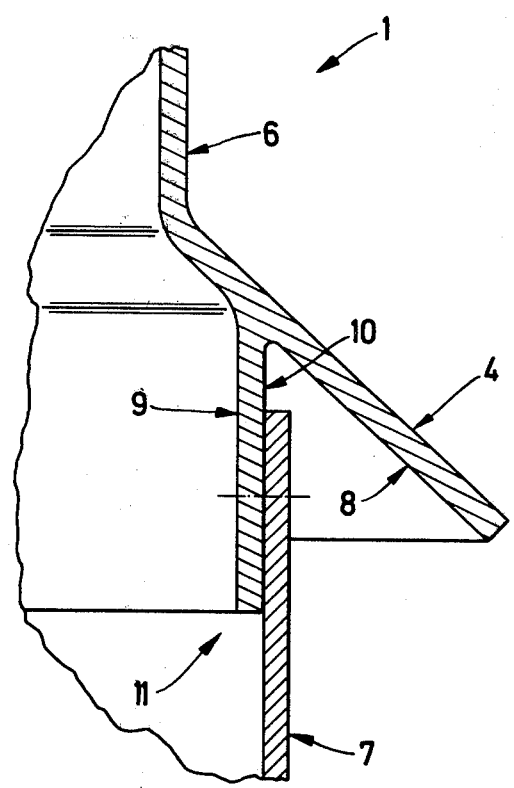
Figure 3:
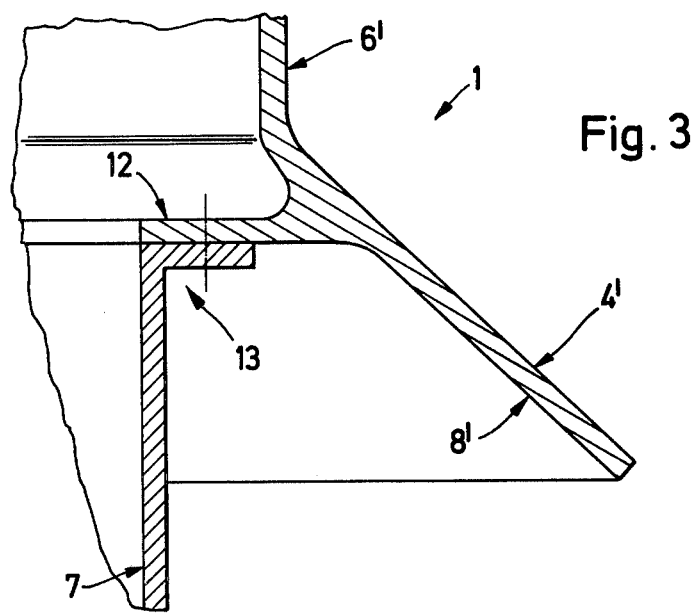

These and other objects, features and advantages of the present invention will become more apparent from the following description when taken in connection with the accompanying drawing which shows, for purposes of illustration only, several embodiments in accordance with the present invention, and wherein:

FIG. 1 is a front elevational view of a motorcycle covering in accordance with the present invention; and FIGS. 2 and 3 are partial enlarged cross-sectional views through two embodiments of a spoiler in accordance with the present invention, taken along line A—A of FIG. 1.

Referring now to the drawing wherein corresponding reference numerals are used throughout the various views to designate like parts, the covering in the form of a fairing generally designated by reference numeral 1 for a motorcycle (not shown) is shown in FIG. 1. The fairing-like covering 1 covers essentially the area of the handlebar as well as lateral areas of the motorcycle and extends in height approximately from the lower edge of the drive block up to above the handlebar. The covering 1 is provided at the front side 2 with openings 3 and 3' for the passage of fork legs of a front wheel fork through the covering 1. Underneath the openings 3 and 3', a spoiler 4 extends over the front face 2, which is continued in the longitudinal sides 5 and 5' of the covering 1. The covering 1 is formed of an upper part 6 and of a lower part 7. The connecting place of the upper part 6 with the lower part 7 is covered off by the spoiler 4 at the covering 1.

As can be seen from FIG. 2, the spoiler 4 is formed integral with the upper part 6 of the fairing-like covering 1 preferably made of synthetic plastic material of any suitable type. For the formation of the spoiler 4, the upper part 6 is constructed in its lower edge area projecting obliquely outwardly and downwardly from the motorcycle. A connecting flange 9 for the lower part 7 of the covering 1 is arranged at the spoiler 4 along the inner side 8 thereof. The connecting flange 9 is arranged at the spoiler 4 vertically directed and is constructed flat on both sides. Preferably, the connecting flange 9 is connected with the lower part 7 by way of its surface 10 facing the spoiler 4. The upper part 6 and the lower part 7 may be arranged overlapping one another at the connecting place 11 by means of the connecting flange 9 whereby no limits are imposed in an advantageous manner on the selection of the means connecting the upper part 6 and the lower part 7, for example, on threaded connections involving bolts or nuts. With threaded connections having large bolt or screw projections, the latter are appropriately arranged as pointing toward the spoiler 4. The spoiler 4 which is "open downwardly" further offers the advantage that one is able to get to the threaded connection in the connecting place 11 also from the outside of the covering 1. Consequently, in case of need, also a threaded connection involving a threaded bolt or screw and nut may be chosen. Finally, a threaded connection adapted to be handled from the outside of the covering 1 may also be selected which enables a rapid removal and installation of the lower part 7 at the upper part 6. Finally, special measures for sealing the connecting place 11 may be dispensed with as a result of the location of the connecting place 11 within the protection of the spoiler 4.

FIG. 3 illustrates another possibility of the arrangement of a connecting flange 12 along the inner side 8' of a spoiler 4'. The connecting flange 12 is thereby arranged directed essentially horizontally. The lower part 7' cooperates with the connecting flange 12 by way of an angularly bent edge 13.

Finally, the extensions 40, 40', 40" as well as 400, 400', 400" of the spoiler 4, 4', 4" are arranged rising upwardly toward the rear along the longitudinal sides 5 and 5' of the covering 1.

In addition to the known effects of a spoiler for increasing the driving safety, also an improved appearance of the fairing together with a simple connection of the upper and lower part is achieved by means of the described invention, whereby the upper part—for example, at higher ambient temperatures—can be removed with little effort and expenditure.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A covering for a motorcycle which covers essentially the frontal area of the motorcycle from the handlebar down to the drive means as well as lateral areas of the motorcycle, and which consists essentially of an upper part and a lower part connected together in the area of a spoiler means formed integrally with the upper part and wherein the covering forms a fairing and the upper part, for purposes of forming the spoiler means, is constructed in its lower edge area projecting obliquely outwardly and downwardly from the motorcycle, characterized in that a connecting flange for the lower part is arranged at the spoiler means along the inner side thereof.

2. A covering according to claim 1, characterized in that the connecting flange is essentially vertically directed.

3. A covering according to claim 1, characterized in that the connecting flange is essentially horizontally directed.

4. A covering according to claim 1, characterized in that the spoiler means extends from the frontal area of the covering into the portions thereof covering the lateral areas of the motorcycle and rises upwardly toward the rear.

* * * * *